(12) United States Patent
Xiong et al.

(10) Patent No.: US 9,913,346 B1
(45) Date of Patent: Mar. 6, 2018

(54) SURGE PROTECTION SYSTEM AND METHOD FOR AN LED DRIVER

(71) Applicant: Universal Lighting Technologies, Inc., Madison, AL (US)

(72) Inventors: Wei Xiong, Madison, AL (US); Scott Price, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 37 days.

(21) Appl. No.: 15/234,006

(22) Filed: Aug. 11, 2016

Related U.S. Application Data

(60) Provisional application No. 62/203,449, filed on Aug. 11, 2015.

(51) Int. Cl.
| | |
|---|---|
| *H05B 33/08* | (2006.01) |
| *H05B 41/282* | (2006.01) |
| *H05B 37/03* | (2006.01) |
| *H05B 41/285* | (2006.01) |

(52) U.S. Cl.
CPC ..... *H05B 33/0887* (2013.01); *H05B 41/2828* (2013.01); *H05B 37/03* (2013.01); *H05B 41/2851* (2013.01)

(58) Field of Classification Search
CPC ............ H05B 41/2828; H05B 41/2981; H05B 41/2985

USPC .... 315/291, 307–326, 247, 224, 225, 185 S, 315/209 R
See application file for complete search history.

(56) References Cited

U.S. PATENT DOCUMENTS

| | | | |
|---|---|---|---|
| 5,739,645 A * | 4/1998 | Xia ................... | H05B 41/2981 315/209 R |
| 8,115,405 B2 * | 2/2012 | Yamahara .......... | H05B 41/2883 315/276 |
| 2014/0111089 A1 * | 4/2014 | Guleria ............. | H05B 41/2986 315/121 |

* cited by examiner

*Primary Examiner* — Tuyet Vo
(74) *Attorney, Agent, or Firm* — Patterson Intellectual Property Law, P.C.; Mark J. Patterson; Grant M. Ford

(57) ABSTRACT

A protection system for an LED driver includes a voltage rail, an input voltage source, and a surge protector connected between the input voltage source and the voltage rail. The voltage change sensing block detects a change in a voltage associated with the input voltage source. The protection system further includes a voltage sensing block connected to the voltage change sensor. A half-bridge switching circuit may include a switch controller, a first switching element, and a second switching element. The switch controller controls an operating state of each of the first switching element and the second switching element. A reset block disables at least one of the switch controller, the first sensing element, and the second switching element, responsive to a control signal associated with at least one of the voltage change sensing block and the voltage sensing block.

20 Claims, 4 Drawing Sheets

SURGE PROTECTION SYSTEM AND METHOD FOR AN LED DRIVER

CROSS-REFERENCES TO RELATED APPLICATIONS

This application claims benefit of U.S. Provisional Patent Application No. 62/203,449, dated Aug. 11, 2015, entitled "Surge Protection Circuit and Method," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to surge protection systems and methods. More particularly, the present invention relates to providing multiple levels of surge protection for a power supply by sensing changes in an input voltage over time and sensing a DC voltage of the power supply.

Electronic power supplies are vulnerable to high voltage surges caused, for example, by lightning strikes. One defense to high voltage surges caused by lightning strikes is to provide outdoor surge protection. One standard for outdoor surge protection is the ability to withstand a 6 kV or 10 kV surge from a combination wave generator.

Two-stage half-bridge type converters or inverters are used widely in power supply design. FIG. 1 illustrates an exemplary embodiment of a related art power supply with a half-bridge type inverter/converter having a surge protector. When a high voltage surge appears across the line and neutral of the input Vac, even with a surge protector a high voltage is presented across capacitor C1 and the voltage rail. A surge protector is connected in parallel with the input Vac to limit the voltage to the rest of the circuit. Without any further protection, semiconductor components, particularly switches Q1 and Q2, may be damaged by the surge because switches Q1 and Q2 are designed to meet a steady state voltage requirement. For example, if the rail voltage V_rail is around 470 volts DC, a 600 volt-rated switch Q1 and a 600 volt-rated Q2 will be used. If the rail voltage V_rail exceeds 600 volts during a surge condition, switches Q1 and Q2 will be easily damaged and cause failure of the entire circuit or system.

Diodes D1-D4 together form an input rectification circuit that converts the AC input voltage to a DC rail voltage. Capacitor C1 is a high frequency filter capacitor. A power factor correction (PFC) stage 120 is coupled between the input and second stage half-bridge DC-DC converter.

Switches Q1 and Q2 form a half-bridge DC-DC converter in FIG. 1. Switches Q1 and Q2 may take the form of any type of switching device, such as a MOSFET, a BJT, an IGBT, etc. The integrated circuit (IC) 130 is a half-bridge drive IC. The voltage Vcc represents the power supply input of the IC 130. IC 130 typically has a disable pin to turn off the gate drive signal. A load 140 (or power tank) is connected to the output of half-bridge (e.g., between the switches Q1 and Q2). The PFC stage 120 regulates the input current to achieve a high power factor, as well as to provide a stable DC rail voltage (V_rail) to the half-bridge DC-DC converter.

What is needed in the art is a fast triggering surge protection circuit in a power supply whose AC input is already connected to an existing surge protection means to provide protection for switching components.

BRIEF SUMMARY OF THE INVENTION

Embodiments consistent with the present invention include one or more circuits designed to address a 6 kV combo wave surge problem relating to outdoor LED drivers. In the circuit illustrated in FIG. 1, if switches Q1 and Q2 are turned off during an input line surge, switches Q1 and Q2 will be able to block twice the voltage that each of switches Q1 and Q2 could block while turned on. For example, two 600 volt-rated switches Q1 and Q2 connected in series will be able to block a 1200V voltage surge across the voltage rail successfully if powered off during a surge event. If the protection threshold voltage of line surge protection is set below twice the voltage rating of switches Q1 and Q2, the circuit will to survive the surge.

Embodiments consistent with the present invention address problems with related art systems by providing multiple detection and mitigation improvements for power supply circuits. For example, in one implementation, half-bridge switching components may be turned off during an input line surge condition to help the half-bridge survive the surge condition. Using a dv/dt sensing circuit may enable fast shutdown of an integrated circuit when a surge occurs. A DC overvoltage sensing circuit may be used to sense an overvoltage event across the rail voltage to ensure that the half-bridge is in shutdown mode when the rail voltage is greater than one or more switch's maximum rated voltage. The dv/dt sensing circuit and the DC overvoltage sensing circuit may be implemented together to ensure reliable integrated circuit shutdown.

One object of the systems and methods as disclosed herein is a protection system for a light emitting diode (LED) driver. The protection system includes a voltage rail, an input voltage source which provides input power to the voltage rail, and a surge protector coupled between the input voltage source and the voltage rail. A voltage change sensing block detects a change in a voltage associated with the input voltage source. The protection system further includes a voltage sensing block connected to the voltage change sensor. The protection system also includes a half-bridge switching circuit having an integrated circuit controller, a first switching element, and a second switching element. The integrated circuit controller controls an operating state of each of the first switching element and the second switching element. A reset block is connected to the integrated circuit controller. The reset block disables at least one of the integrated circuit controller, the first sensing element, and the second switching element, responsive to a control signal associated with at least one of the voltage change sensing block and the voltage sensing block.

Another object of the invention provides methods of providing surge protection by a protection device for an LED driver. The protection device includes a voltage change sensing block, voltage sensing block, and a controller. The method begins by controlling a half-bridge switch of the protection device by the controller. Input power is received from an input power source. A reset condition may be detected from at least one of the voltage change sensing block and the voltage sensing block. At least a portion of the half-bridge switch may be caused to power off when the reset condition is detected.

DETAILED DESCRIPTION OF THE INVENTION

Figure 1:
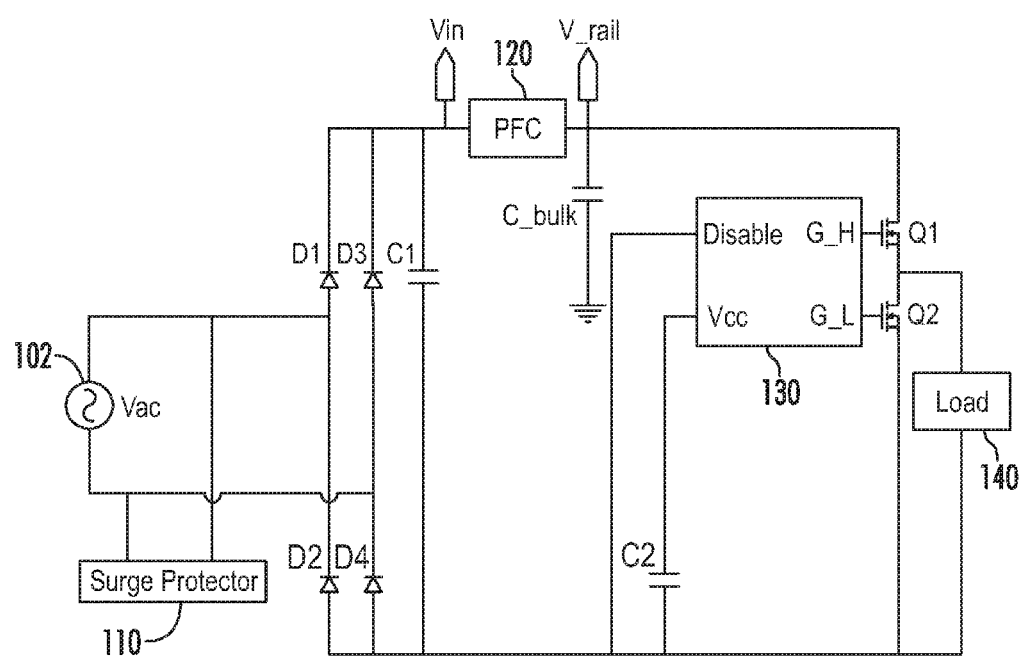
FIG. 1 is a partial schematic view of a related art power supply circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-4, an exemplary surge protection apparatus, system, and associated methods are now illustrated in greater detail. Where the various figures may describe embodiments sharing various common elements and features with other embodiments, similar elements and features are given the same reference numerals and redundant description thereof may be omitted below.

Figure 2:
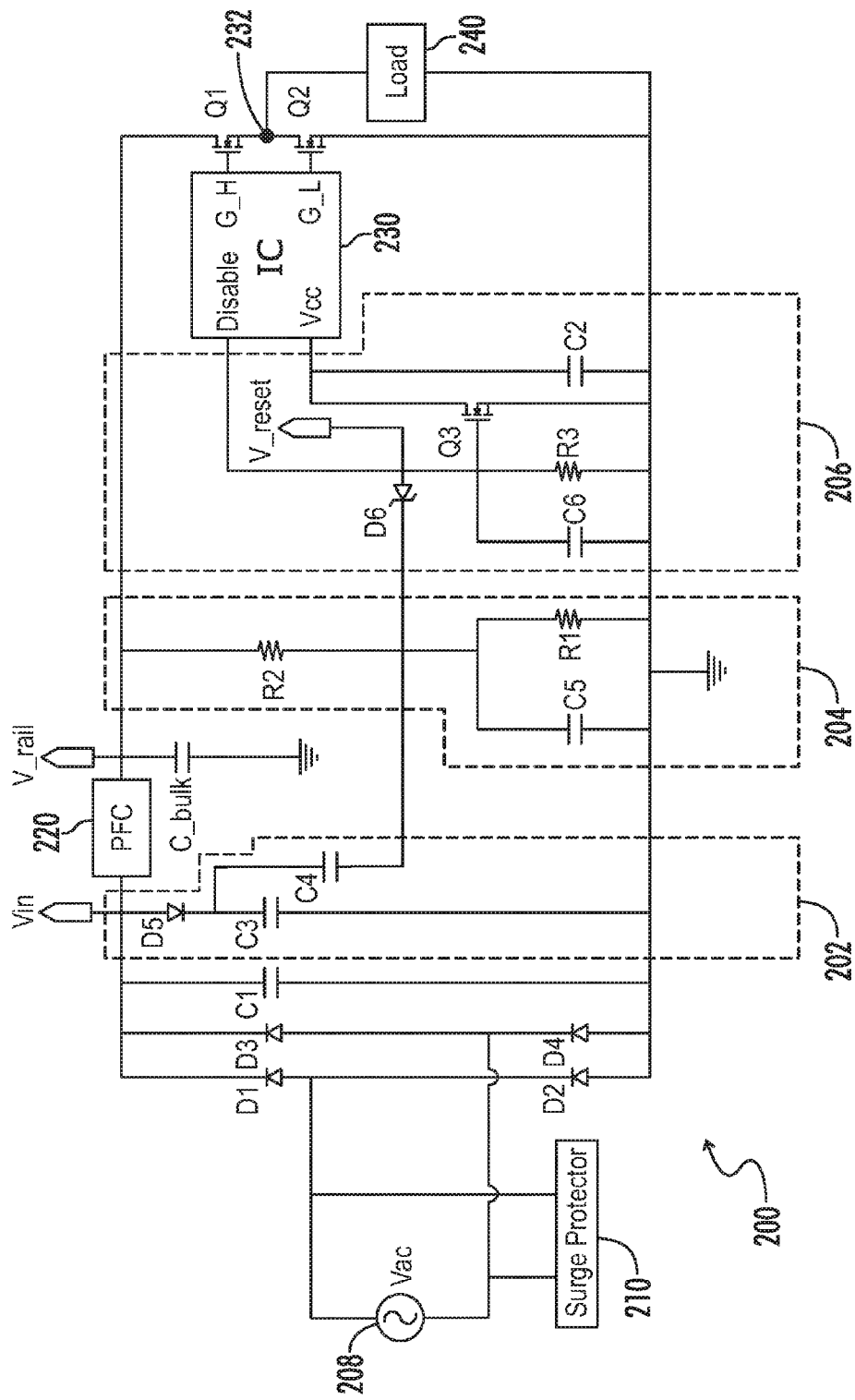
FIG. 2 is schematic of a power supply circuit according to an exemplary embodiment of the present invention.

FIG. 2 illustrates a partial circuit schematic illustrating a surge protection circuit 200 capable of protecting half-bridge switching components during an input surge condition. FIG. 2 shows three functional blocks in dashed lines. These functional blocks include a dv/dt sensing block 202, a direct current (DC) voltage sensing block 204, and an integrated circuit (IC) reset circuit block 206.

The surge protection circuit 200 receives input voltage Vac from a voltage source 208. A surge protector 210 is connected to one or more output terminals of the voltage source 208. The surge protector 210 provides surge protection for the input voltage Vac from the voltage source 208. The one or more terminals of the voltage source 208 are further connected to diodes D1, D2, D3, and D4. The diodes D1, D2, D3, and D4 are arranged as a full bridge rectifier in one exemplary embodiment. Although illustrated as an alternating current (AC) voltage source and having a full wave rectifier, it should be understood by one having ordinary skill in the art that the voltage source 208 may be implemented as a DC voltage source. In embodiments where the voltage source 208 is a DC voltage source, the diodes D1, D2, D3, and D4 may be optionally omitted from or otherwise bypassed by the surge protection circuit 200. As described with reference to FIG. 1, the diodes D1-D4 may be configured to form an input rectification circuit to convert AC input to a DC rail. Capacitor C1 may take the form of a high frequency filter capacitor.

The dv/dt sensing block 202 includes a diode D5 and two capacitors C3 and C4. Diode D5 and capacitor C3 form a peak charging circuit to sense a peak voltage of an input voltage V_in. Capacitor C4 may be used to sense a peak changing rate. Capacitor C4 may connect to a capacitor C5 and to a resistor R1 to create a dv/dt voltage sensing level. In steady state operation, the peak voltage at C3 does not change, thus capacitor C4 will not see any AC current passing through and there is no additional signal added to capacitor C5 and resistor R1. Capacitor C4 may be configured to block DC current from going into the capacitor C5 and resistor R1 during steady state operation.

The surge protection circuit 200 includes a DC voltage sensing block 204. The DC voltage sensing block 204 may include a resistor R2 connected to an output of the power factor correction (PFC) block 220 at one end and at the other end to a parallel configuration of a resistor R1 and a capacitor C5. The DC voltage sensing block 204 may be used to sense a steady state DC voltage level voltage V_rail. In one exemplary embodiment, the voltage V_rail, which is output along a V_rail bus from the PFC block 220, may be measured at a node joining the V_rail bus and one side of a bulk or decoupling capacitor C_bulk. The PFC block 220 is connected between the input voltage source side of surge protection circuit 200 and to a DC voltage sensing block 204 at an output of the PFC block 220.

The DC voltage sensing block 204 may include resistors R2 and R1 configured to form a voltage sensor in one exemplary embodiment. For example, the resistors R2 and R1 may form a voltage divider in one embodiment. The voltage divider may be designed such that, when operating in steady state, the voltage across resistor R1 will be less than the clamping voltage of a diode D6. The diode D6 may take the form of a Zener diode in one embodiment. The voltage across diode D6 (V_D6) and the voltage divider circuit may be such that during operation the relationship between V_rail and V_D6 is represented by the relationship V_rail*(R2/(R1+R2))<V_D6.

The surge protection circuit 200 includes an integrated circuit (IC) 230. In one exemplary embodiment, the IC 230 is a half-bridge DC-DC converter configured to receive one or more control signals and power inputs and to provide a DC output in accordance with the one or more control signals and power inputs. The IC 230 is configured to drive a first switching element (e.g., a MOSFET) Q1 and a second switching element Q2 (e.g., a MOSFET), which are connected in series between the V_rail voltage bus and circuit ground. In one exemplary embodiment, the IC 230 may be an L6384 High Voltage Half-Bridge Driver, which is commercially available from STMicroelectronics.

The first and second switching elements Q1 and Q2 are connected at a common node 232 therebetween. When the first switching element Q1 is turned on, the common node 232 is pulled up to the voltage V_rail. When the second switching element Q2 is turned on, the common node 232 is pulled to ground. The two switching elements Q1 and Q2 are operated in a conventional manner at a selected frequency and with selected duty cycles to produce a switched DC voltage at the common node 232 that alternates between V_rail and ground.

The common node 232 between the two switching elements Q1 and Q2 is connected to a load 240. In one exemplary embodiment, the common node 232 between switching elements Q1 and Q2 may be connected to a power tank circuit (not illustrated), the power tank circuit being located between the common node 232 and the load 240. In this configuration, the IC 230, switching elements Q1 and Q2, and power tank circuit operate as a resonant DC-DC converter to convert the V_rail voltage on the V_rail bus to a designated voltage (e.g., as an LED voltage applied to an LED load).

The surge protection circuit 200 includes an IC reset block 206. The IC reset block 206 includes a reset switch Q3 connected between a Vcc input of the IC 230 and ground, and is controlled via a V_reset signal received through the diode D6. The V_reset signal is used as an input to the IC 230 as a disable input, and is connected to a capacitor C6, a resistor R3, and the reset switch Q3 in a parallel configuration in one exemplary embodiment. The IC reset block 206 is configured to reset or otherwise manipulate an operational setting of the IC 230 whenever a power surge or overvoltage is measured or detected at V_in or V_rail using at least one of the dv/dt sensing block 202 and DC voltage sensing block 204. The IC reset block 206 may include a capacitor C2 connected at one end to the Vcc input of IC 230 and to ground at the other end. The capacitor C2 may be configured to operate as a power storage device and is configured to provide operating power to the IC 230 in one exemplary embodiment.

Figure 3:
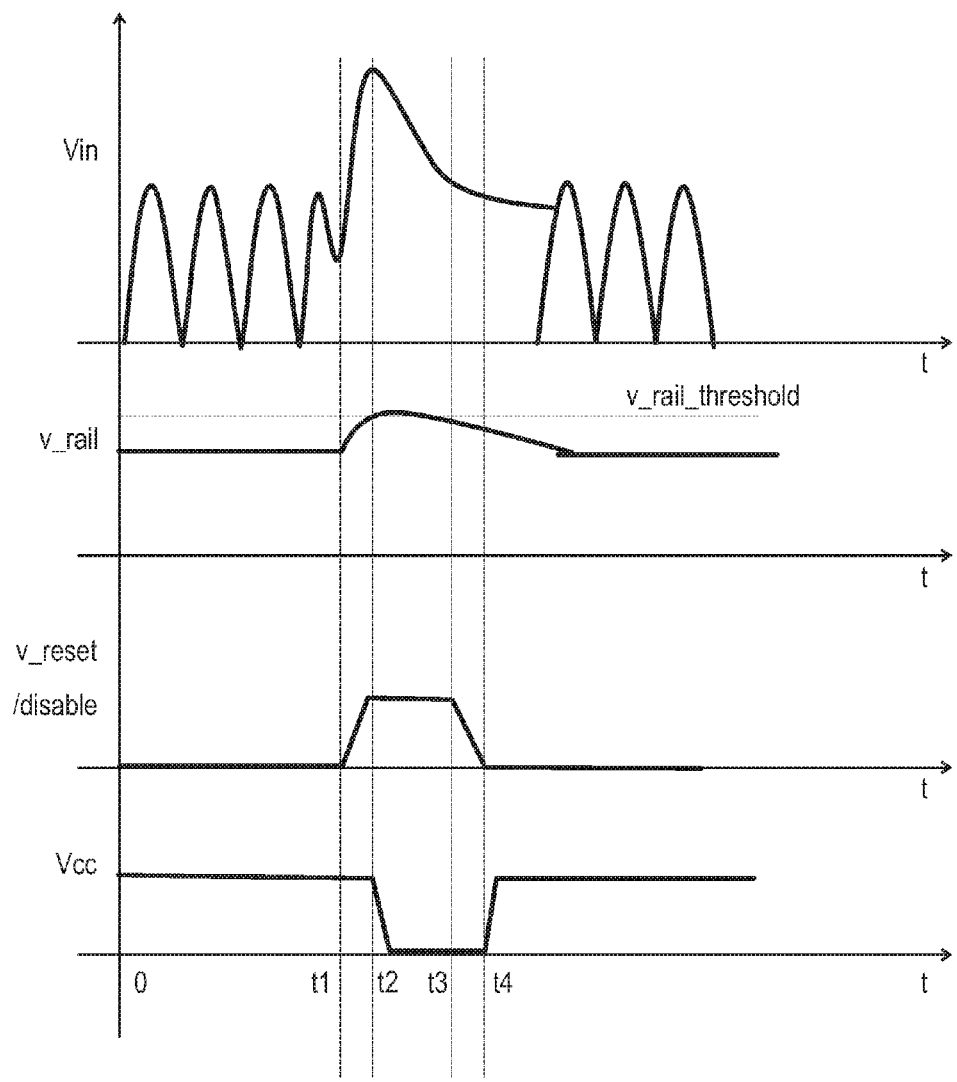
FIG. 3 is a timing diagram showing an input surge condition in relation to a power supply circuit according to FIG. 2.

Fig. 3. illustrates a protection timing sequence for a surge protection circuit (e.g., surge protection circuit 200) during steady-state operation. As shown with reference to time t=0, the input AC voltage V_in may take the form of a rectified half-wave AC voltage. The voltage V_rail is a constant voltage when operating in steady-state. The voltage V_reset is zero during steady-state operation because of the relationship between V_rail and V_D6 such that V_rail*(R2/(R1+R2)) <V_D6. The IC input voltage Vcc is high at time t=0.

At time t1, an input power surge occurs. A large voltage spike forms across V_in responsive to the power surge. The change in voltage over time dv/dt (e.g., as sensed in accordance with dv/dt sensing block 202) may be very high during a surge event in one exemplary embodiment. The capacitor C4 of the dv/dt sensing block 202 may be configured to sense the fast voltage change at the capacitor C3 and translate this fast dv/dt value to a differential current. The reset voltage V_reset is configured to increase starting at time t=1 based at least in part upon the differential current.

Between times t1 and t2, the surge protection circuit causes the differential current to quickly charge the capacitor C5 to a high voltage. In one exemplary embodiment, this high voltage is greater than the voltage V_D6. When the diode D6 conducts, the capacitor C6 is charged to a high voltage. Between times t1 and t2, the rail voltage V_rail increases towards a rail voltage threshold V_rail_threshold. In one embodiment, the V_rail_threshold may be equivalent to twice the voltage rating of switching elements Q1 and Q2 in a series configuration. Alternatively or additionally, in various embodiments the rail voltage threshold V_rail_threshold may correspond to any predetermined or dynamically determined voltage threshold, for example in association with at least one characteristic of switching element Q1, switching element Q2, or any weighted or unweighted combination thereof (such as being equal to the combined voltage rating of switching elements Q1 and Q2 in a series configuration)

At time t2 an IC (e.g., IC 230) may be reset due to a high V_reset voltage. The high V_reset voltage may also turn on the reset switch Q3 and discharge the capacitor C2 (which may be configured to operate as a power supply for the IC, as previously described) very fast to 0 to further ensure that the IC is shut down.

Between times t2 and t3, bulk voltage will be charged up by the surge current to a higher voltage level than a normal steady-state V_rail voltage. This high level V_rail ensures that the voltage at the resistor R1 is greater than the D6 diode voltage V_D6 after the surge spike begins. Thus, even after the initial surge spike is complete, the high level V_rail voltage will ensure that the reset voltage V_reset is high and IC shutdown is maintained.

At time t3, the rail voltage V_rail falls beneath a protection threshold voltage. In one exemplary embodiment, the protection threshold voltage corresponds to twice the combined series voltage suppression capability of the switching elements Q1 and Q2. As a result of V_rail falling below the protection threshold voltage, the voltage across resistor R1 will be less than the diode D6 voltage V_D6. In this case, the diode D6 stops conducting at time t3. Between times t3 and t4, the reset voltage V_reset naturally discharges itself through the resistor R3.

At time t4, the reset voltage V_reset returns to 0 and the IC is enabled. The IC input voltage Vcc is charged up by power supply circuit (e.g., via V_in) and normal operation is permitted to resume at a safe rail voltage level V_rail.

Various implementations described herein provide double protection superposed on an IC reset circuit. Providing input dv/dt sensing permits triggering an IC shutdown very fast whenever a surge happens. Steady-state DC rail voltage sensing further ensures that half-bridge is in shutdown mode when the rail voltage V_rail is greater than the MOSFET maximum rated voltage (e.g., associated with at least one of the switching elements Q1 and Q2). Normal operation of an IC may be configured to resume when the rail voltage V_rail drops to a safe level (e.g., less than at least one of or a combined switching element Q1 and Q2 maximum rated voltage).

Figure 4:
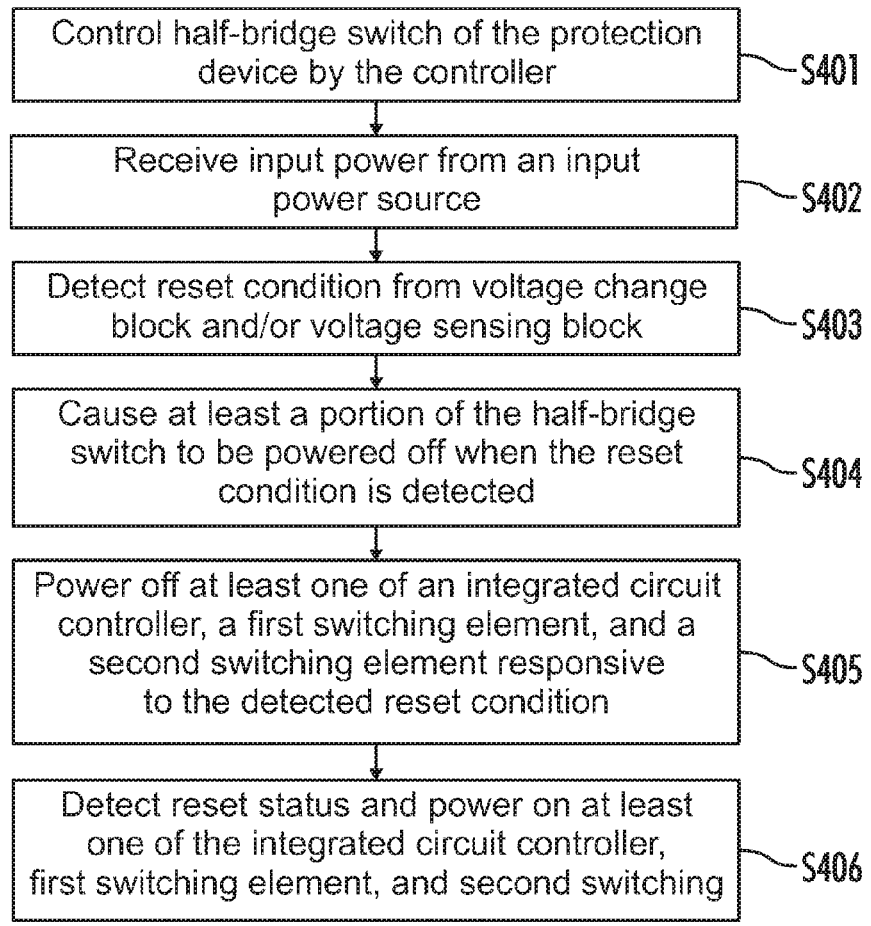
FIG. 4 illustrates a flowchart of a method for surge protection for a power supply circuit as provided in FIG. 2, according to an exemplary embodiment of the present disclosure.

FIG. 4 illustrates a flowchart of a method 400 for surge protection for a power supply circuit as provided in FIG. 2, according to an exemplary embodiment of the present disclosure. The method begins at a step S401, where a controller is enabled to control a half-bridge switch of the protection device by the controller. The method continues to a step S402, where input power is received from an input power source (e.g., an AC power input). In various exemplary embodiments, the AC power input may be converted to DC power, for example by means of a rectifier configuration illustrated in FIG. 2. At a step S403, a reset condition may be detected from the voltage change sensing block and/or voltage sensing block. At a step S404, at least a portion of the half-bridge switch may be caused to power off when the reset condition is detected.

At least one of an integrated circuit controller, a first switching element, and a second switching element may be powered off responsive to the detected reset condition at a step S405. A reset status may be detected at a step S406 and at least one of the integrated circuit controller, first switching element, and second switching element may be powered on.

The surge protection circuit described herein can effectively solve the input surge problems by turning off a half-bridge switching circuit, such as IC 230, whenever an overvoltage is sensed across a voltage rail and/or when an input dv/dt measurement quickly rises.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A protection system for a light emitting diode (LED) driver, the protection system comprising:
   a voltage rail;
   an input voltage source configured to provide input power to the voltage rail;
   a surge protector coupled between the input voltage source and the voltage rail;
   a voltage change sensing block configured to detect a change in a voltage associated with the input voltage source;
   a voltage sensing block coupled to the voltage change sensing block;
   a half-bridge switching circuit comprising a controller, a first switching element, and a second switching element, the controller configured to control an operating state of each of the first switching element and the second switching element; and
   a reset block connected to the controller, the reset block configured to disable at least one of the controller, the first sensing element, and the second switching element responsive to a control signal associated with at least one of the voltage change sensing block and the voltage sensing block.

2. The protection system of claim 1, wherein the controller comprises a disable input, the disable input being connected to each of the voltage change sensing block, the voltage sensing block, and the reset block.

3. The protection system of claim 2, wherein the controller is configured to turn off at least one of the controller, the first switching element, and the second switching element when a reset voltage is received at the disable input of the controller.

4. The protection system of claim 1, wherein the controller comprises a voltage input, the voltage input being connected to both an input power capacitor and a reset switch.

5. The protection system of claim 4, wherein the controller is configured to cause at least one of the controller, the first switching element, and the second switching element to shut down when the reset switch is turned on and the input power capacitor discharges.

6. The protection system of claim 1, further comprising:
   a reset voltage signal line, the reset voltage signal line connected to each of the voltage change sensing block, the voltage sensing block, and the reset block; and
   the controller comprises a disable input and a voltage input, the controller configured such that at least one of the controller, the first switching element, and the second switching element are powered off when a reset signal is received from at least one of the voltage change sensing block, the voltage sensing block, and the reset block, via the reset voltage signal line.

7. A method of providing surge protection by a protection device for an LED driver, the protection device having a voltage change sensing block, voltage sensing block, and a controller, the method comprising:
   controlling a half-bridge switch of the protection device by the controller;
   receiving input power from an input power source;
   detecting a reset condition from at least one of the voltage change sensing block and the voltage sensing block; and
   causing at least a portion of the half-bridge switch to be powered off when the reset condition is detected.

8. The method of claim 7, wherein:
   (i) the reset condition comprises an indication that a surge condition was detected by the voltage change sensing block;
   (ii) at least one of an integrated circuit controller, a first switching element, and a second switching element are powered off responsive to the detected reset condition; and
   (iii) the at least one of the integrated circuit controller, first switching element, and second switching element are powered on when the reset status is detected.

9. The method of claim 7, wherein:
   (i) the reset condition comprises an indication that an overvoltage condition was detected by the voltage sensing block;
   (ii) at least one of an integrated circuit controller, a first switching element, and a second switching element are powered off responsive to the detected reset condition; and
   (iii) the at least one of the integrated circuit controller, first switching element, and second switching element are powered on when the reset status is detected.

10. The method of claim 7, wherein the reset condition is detected via a common reset signaling line, the common reset signaling line being connected to both the voltage change sensing block and the voltage sensing block and being configured to convey a voltage reset signal provided by at least one of the voltage change sensing block and the voltage sensing block.

11. The method of claim 7, wherein:
the voltage change sensing block detects a surge condition, an indication of the detected surge condition is transmitted to the controller of the protection device; and
the controller powers off an integrated circuit controller, a first switching device, and a second switching device of the half-bridge switch responsive to the indication of the detected surge condition.

12. The method of claim 11, further comprising:
monitoring a status of the protection device after causing the at least a portion of the half-bridge switch to be powered off; and
powering on the at least portion of the half-bridge switch when a reset status is detected.

13. The method of claim 7, wherein:
the voltage sensing block detects an overvoltage condition, an indication of the detected overvoltage condition is transmitted to the controller of the protection device; and
the controller powers off an integrated circuit controller, a first switching device, and a second switching device of the half-bridge switch responsive to the indication of the detected overvoltage condition.

14. The method of claim 13, further comprising:
monitoring a status of the protection device after causing the at least a portion of the half-bridge switch to be powered off; and
powering on the at least portion of the half-bridge switch when a reset status is detected.

15. A protection apparatus for a light emitting diode (LED) driver, the protection apparatus comprising:
a voltage rail;
a voltage change sensing block configured to detect a change in a voltage associated with the voltage rail;
a voltage sensing block connected to the voltage change sensing block;
a half-bridge switching circuit comprising a switching controller, a first switching element, and a second switching element;
a controller reset block comprising a reset switch and power capacitor, wherein the controller reset block is configured to control the half-bridge switching circuit to perform at least one of powering on and powering off at least one of the switching controller, the first switching element, and the second switching element.

16. The protection apparatus of claim 15, wherein the switching controller comprises a disable input, the disable input being connected to each of the voltage change sensing block, the voltage sensing block, and the controller reset block.

17. The protection apparatus of claim 16, wherein the switching controller is configured to turn off at least one of the switching controller, the first switching element, and the second switching element when a reset voltage is received at the disable input of the integrated circuit controller.

18. The protection apparatus of claim 15, wherein the switching controller comprises a voltage input, the voltage input being connected to both an input power capacitor and a reset switch.

19. The protection apparatus of claim 16, wherein the switching controller is configured to cause at least one of the switching controller, the first switching element, and the second switching element to shut down when the reset switch is turned on and the input power capacitor discharges.

20. The protection apparatus of claim 15, wherein the controller reset block is configured to cause at least one of the switching controller, first switching apparatus, and second switching apparatus to power on after having been turned off by the switching controller, when a reset signal is received at the reset block.

* * * * *